United States Patent
Scott (10) Patent No.: US 8,533,093 B1
(45) Date of Patent: Sep. 10, 2013

(54) GENERAL OBLIGATION BONDS FOR SHORT ASSET LIFE EQUIPMENT

(75) Inventor: Dale Scott, San Francisco, CA (US)

(73) Assignee: Dale Scott & Co., Inc., San Francisco, CA (US)

( * ) Notice: Subject to any disclaimer, the term of this patent is extended or adjusted under 35 U.S.C. 154(b) by 0 days.

(21) Appl. No.: 13/606,847

(22) Filed: Sep. 7, 2012

(51) Int. Cl.
*G06Q 40/00* (2012.01)

(52) U.S. Cl.
USPC .......................................... 705/36 R

(58) Field of Classification Search
USPC ..................................... 705/35–45
See application file for complete search history.

(56) References Cited

U.S. PATENT DOCUMENTS

| 6,871,189 B2* | 3/2005 | Brier et al. .................... 705/35 |
| 2008/0243712 A1* | 10/2008 | Clegg et al. ................ 705/36 R |

OTHER PUBLICATIONS

"Fitch Rates VPSA School Educational Technology Notes 'AA+'; Outlook Stable" May 13, 2011 http://www.istockanalyst.com/business/news/5147229/fitch-rates-vpsa-school-educational-technology-notes-aa-outlook-stable.*

* cited by examiner

*Primary Examiner* — Thomas M Hammond, III
(74) *Attorney, Agent, or Firm* — Perkins Coie LLP (57) ABSTRACT

A new type of general obligation bond, called Ed-Tech bonds, is structured to provide on-going funding for a district's technology needs, match the term of the underlying bonds to the useful short-term life of technology assets to be purchased with bond proceeds, and address federal restrictions regarding use of bond proceeds. Further, techniques are described for determining the appropriate financing parameters for the Ed-Tech bonds.

21 Claims, 8 Drawing Sheets

Table 1: Cashflow Assuming $60 Tax Rate

| Year | Assessed Value | Available Tax | Principal | Interest | Financing |
|---|---|---|---|---|---|
| 1 | $ 6,000,000,000 | $3,600,000 | $3,491,740 | $108,260 | |
| 2 | $ 6,135,000,000 | $3,681,000 | $3,607,658 | $73,342 | $ 10,825,955 |
| 3 | $ 6,273,038,333 | $3,763,823 | $3,726,557 | $37,266 | |
| 4 | $ 6,414,181,667 | $3,848,509 | $3,732,776 | $115,733 | |
| 5 | $ 6,558,500,000 | $3,935,100 | $3,856,695 | $78,405 | $ 11,573,273 |
| 6 | $ 6,706,066,667 | $4,023,640 | $3,983,802 | $39,838 | |
| 7 | $ 6,856,953,333 | $4,114,172 | $3,990,450 | $123,722 | |
| 8 | $ 7,011,235,000 | $4,206,741 | $4,122,923 | $83,817 | $ 12,372,177 |
| 9 | $ 7,168,988,333 | $4,301,393 | $4,258,804 | $42,588 | |
| 10 | $ 7,330,290,000 | $4,398,174 | $4,265,911 | $132,262 | |
| 11 | $ 7,495,221,667 | $4,497,133 | $4,407,529 | $89,603 | $ 13,226,230 |
| 12 | $ 7,663,863,333 | $4,598,318 | $4,552,790 | $45,528 | |
| 13 | $ 7,836,300,000 | $4,701,780 | $4,560,388 | $141,392 | |
| 14 | $ 8,012,616,667 | $4,807,570 | $4,711,782 | $95,789 | $ 14,139,240 |
| 15 | $ 8,192,900,000 | $4,915,740 | $4,867,070 | $48,671 | |
| 16 | $ 8,377,240,000 | $5,026,344 | $4,875,192 | $151,153 | |
| 17 | $ 8,565,728,333 | $5,139,437 | $5,037,036 | $102,401 | $ 15,115,272 |
| 18 | $ 8,758,456,667 | $5,255,074 | $5,203,044 | $52,030 | |
| 19 | $ 8,955,521,667 | $5,373,313 | $5,211,727 | $161,587 | |
| 20 | $ 9,157,021,667 | $5,494,213 | $5,384,744 | $109,470 | $ 16,158,682 |
| 21 | $ 9,363,055,000 | $5,617,833 | $5,562,211 | $55,622 | |
| 22 | $ 9,573,723,333 | $5,744,234 | $5,571,493 | $172,741 | |
| 23 | $ 9,789,131,667 | $5,873,479 | $5,756,453 | $117,026 | $ 17,274,117 |
| 24 | $10,009,386,667 | $6,005,632 | $5,946,171 | $59,462 | |
| 25 | $10,234,598,333 | $6,140,760 | $5,956,094 | $184,666 | |
| 26 | $10,464,876,667 | $6,278,927 | $6,153,822 | $125,105 | $ 18,466,552 |
| 27 | $10,700,336,667 | $6,420,203 | $6,356,636 | $63,566 | |
| 28 | $10,941,095,000 | $6,564,657 | $6,367,244 | $197,413 | |
| 29 | $11,187,270,000 | $6,712,362 | $6,578,621 | $133,741 | $ 19,741,301 |
| 30 | $11,438,983,333 | $6,863,390 | $6,795,436 | $67,954 | |
| Total | | $151,902,951 | $148,892,799 | $3,010,153 | $148,892,799 |

GENERAL OBLIGATION BONDS FOR SHORT ASSET LIFE EQUIPMENT

BACKGROUND

School and community college ("K-14") districts face significant challenges in funding the constantly evolving technology needs of students and staff. While there are a few federal, state, and private sector funding programs, they are under-capitalized or focused on low income schools. In addition, few technology funding programs provide for ongoing upgrading and/or replacement of obsolescent equipment. Finally, attempts by K-14 districts to craft financing plans funded with voter approved debt are hampered by federal regulations regarding the spending of bond funds and taxpayer reluctance to use bonds repaid over 25 years or more to fund equipment with a short useful life around three to five years.

BRIEF DESCRIPTION OF THE DRAWINGS

One or more embodiments of the present disclosure are illustrated by way of example and not limitation in the figures of the accompanying drawings.

FIG. 2 shows an example cash flow table.

DETAILED DESCRIPTION

A new type of general obligation (GO) bond, called Ed-Tech bonds, is structured to provide on-going funding for a district's technology needs, match the term of the underlying bonds to the useful short-term life of technology assets to be purchased with bond proceeds, and address federal restrictions regarding use of bond proceeds. Further, techniques are described below for determining the appropriate financing parameters for the Ed-Tech bonds.

Various aspects and examples of the disclosure will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

The technology needs of school and community college districts include not only equipment such as readers, smart boards, computers, iPads, electronic textbooks, software, and state mandated programs, but also costs for technical support staff. Typically, the cost of funding technology is obtained from a district's operating budget. However, currently available technology funding programs are not sufficient to meet the technology funding needs of K-14 districts. Federal programs are limited to districts with lower income populations. State programs have similar constraints and are hampered by current budget problems. Further, most local budgets are inadequate to provide any significant level of technology funding, private grants are limited and hard to obtain.

Some wealthier districts have passed a parcel tax measure, where landowners of the district are charged an annual fee on each parcel of land in the district, and the annual fee is used to fund the district's technology needs. However, a parcel tax measure is very difficult to pass because it requires approval of two-thirds of the voters, and voters in non-affluent districts are hesitant to pass parcel taxes.

Some districts have attempted to use long-term general obligation (GO) bonds. However, GO bonds are almost always structured as long-term debt, amortized over 20 to 30 years or more. By financing technology equipment with a useful life of three to five years with GO bonds that are repaid over 20 years or more, taxpayers are required to continue to pay for equipment that is long past its useful life. Further, due to the short asset life of technology equipment, continual replacement of technology equipment is required. However, GO bond funding programs are generally designed to provide a one-time expenditure over a relatively short (one to seven year) time period.

Additionally, if the GO bonds are sold as tax-exempt securities, as is the case with almost all K-14 GO bonds, federal tax regulations generally require that bond proceeds to be spent within three years of the sale date. This rule does not allow tax-exempt bonds to be sold and the proceeds saved to allow for ongoing replacement of equipment. Some districts have considered investing bond proceeds into other tax-exempt securities so that the proceeds become exempt from the tax regulations and can be saved for future use. However, this type of plan does not solve the underlying problem of amortizing technology equipment over 20 to 30 years.

Figure 1A:
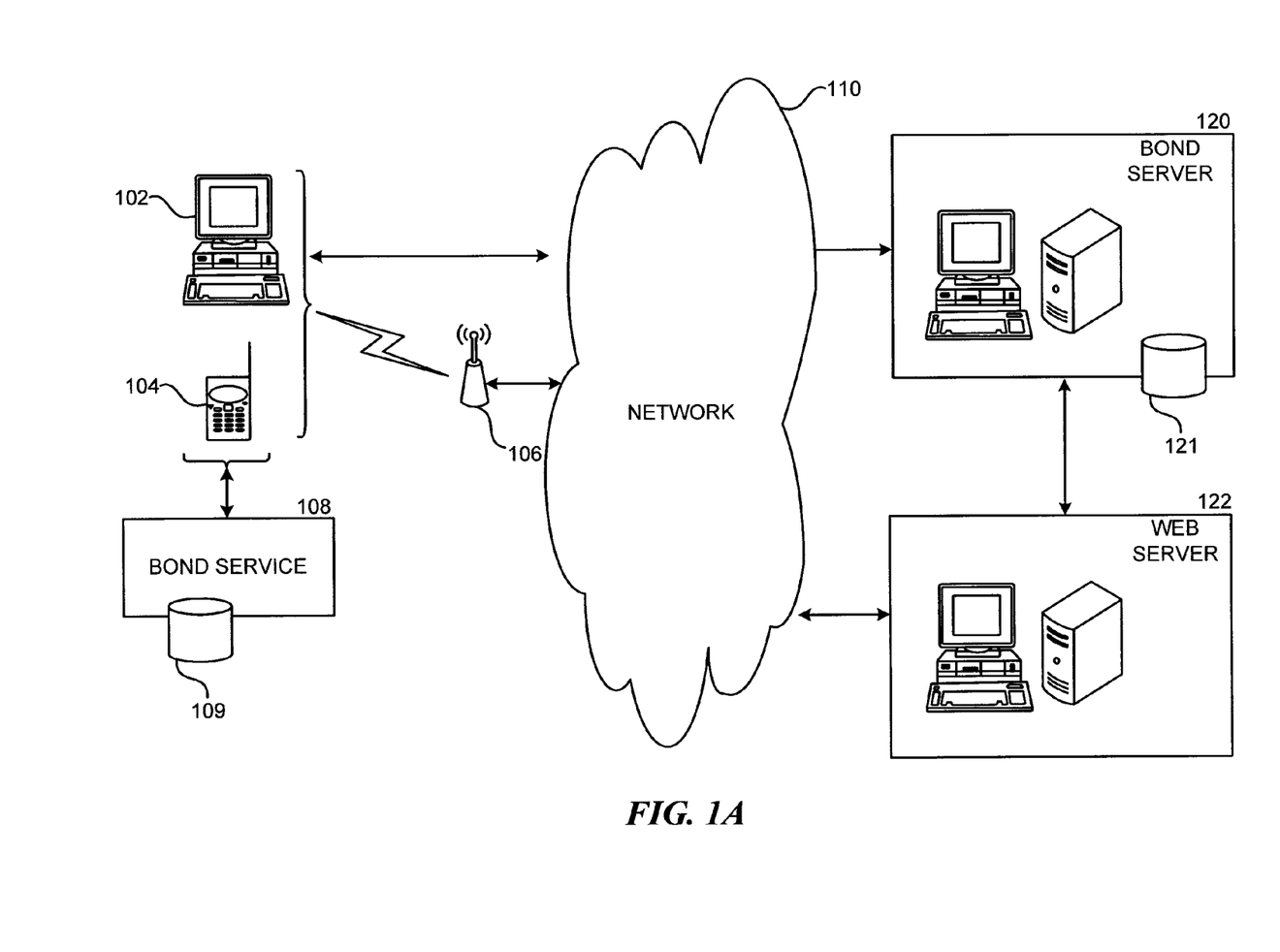
FIG. 1A provides a brief, general description of a representative environment in which the disclosed techniques can be implemented.

Techniques are described below for determining appropriate parameters for an Ed-Tech bond program in a given district. FIG. 1A and the following discussion provide a brief, general description of a representative environment in which the techniques described below can be implemented. Although not required, aspects of the disclosure may be described below in the general context of computer-executable instructions, such as routines executed by a general-purpose data processing device (e.g., a server computer or a personal computer). Those skilled in the relevant art will appreciate that the techniques can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the disclosure, such as certain functions, are described as being performed exclusively on a single device, the techniques can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the disclosure may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the disclosure may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1A, a user may use a personal computing device (e.g., a mobile computing device 104, a personal computer 102, etc.) to execute functionalities for the techniques described herein. The user may also use the personal computing device to communicate with a network. The term "mobile computing device," as used herein, may be a laptop, a netbook, a personal digital assistant (PDA), a smart phone (e.g., a Blackberry®, an I-phone®, etc.), a portable media player (e.g., an IPod Touch®), or any other device having communication capability to connect to the network. In one example, the mobile computing device 104 connects to the network using one or more cellular transceivers or base station antennas (not shown in FIG. 1A), access points, terminal adapters, routers or modems 106 (in IP-based telecommunications implementations), or combinations of the foregoing (in converged network embodiments).

In some instances, the network 110 is the Internet, allowing the personal computing device to access functionalities offered through, for example, the compare server 120 or various web servers. In some instances, the network is a local network maintained by a private entity or a wide area public network, or a combination of any of the above types of networks. In some instances, especially where the mobile computing device 104 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

As shown in FIG. 1A, in some instances, the personal computing device may have a bond service 108 installed locally. In such instances, the user may use the personal computing device to submit requests to the bond service to determine suitable Ed-Tech bond parameters for a particular district or information to be used in evaluating the feasibility of an Ed-Tech bond program by the bond service. As will be explained in detail below, the bond service 108, running on the personal computing device, receives input information for an Ed-Tech bond parameter request and subsequently performs an analysis of suitable school districts and/or college districts for which an Ed-Tech bond program would be advantageous. In such an instance, the bond service 108 presents the school district and/or college district information to the user using a display unit of the personal computing device. Accordingly, the bond service 108 runs as a stand-alone service without requiring a connection to the network 110.

In some instances, the bond service is configured to run remotely on a bond server 120. In such an instance, the bond service is run similar to a web or internet service in conjunction with a web server 122. As explained above, a user may use a personal computing device to connect to the bond server 120 using the network (e.g., a local office network, the Internet, etc.). In an illustrative example of such an instance, the user would use the personal computing device to submit Ed-Tech bond parameter requests to the bond server or information to be used in analyzing the feasibility of an Ed-Tech bond request by the bond server. The bond server 120 receives the requests and performs an analysis of suitable school districts and/or college districts. Subsequent to performing the analysis, the bond server 120 transmits the results of the analysis and/or the parameters for a customized Ed-Tech bond to the personal computing device, which is then displayed using a display unit of the personal computing device. In some instances, the bond server 120 may by itself operate as a web server to receive and transmit contents using standard web protocols. In other instances, the bond server 120 may be coupled to a web server 122, where the Ed-Tech bond server performs the various bond-related services, while the web server enables the transmission and reception of data using standard web protocols.

The bond service 108 can access a local database(s) 109 that contains information needed by the bond service, for example, the historical assessed valuations for each district, information pertaining to economic indicators in each district for modeling future potential growth, the tax rate limit for each district, political characteristics of districts, past voting history of districts, state metrics regarding technology funding on a per student basis for each state, and the number of students in each district. In some instances, the database(s) 109 is accessed over the network 110. Similarly, the bond server 120 can either access a local database 121 containing the above information or access the database over the network 110. Each of the databases 109/121 can include a single database or multiple separate databases.

Figure 1B:
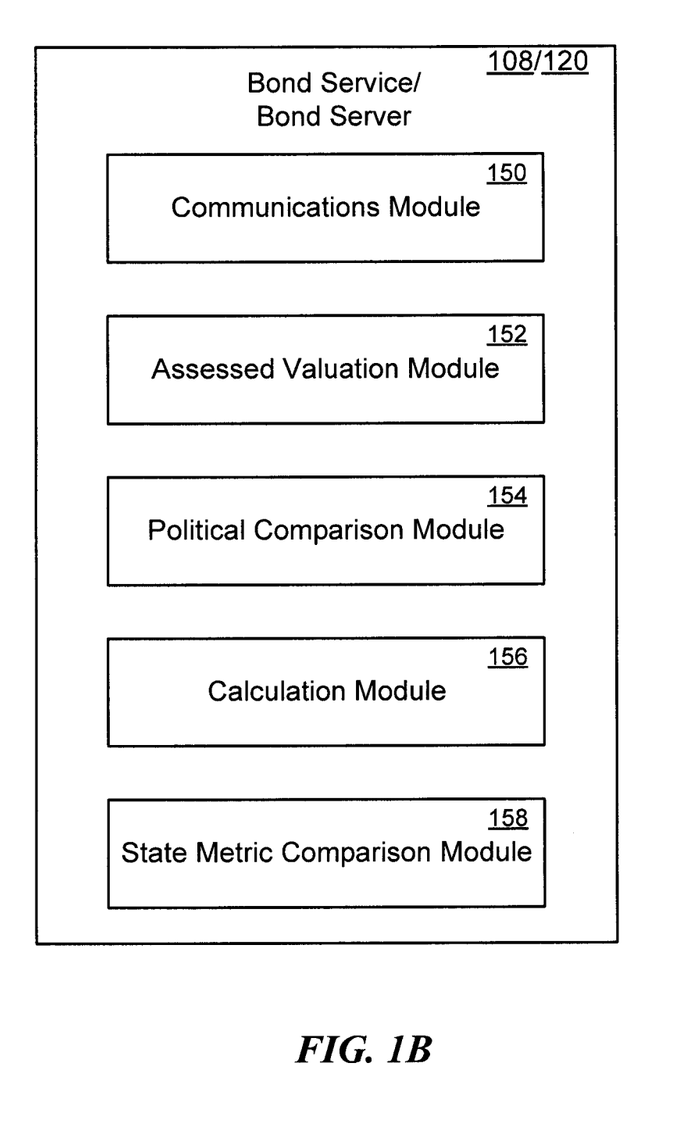
FIG. 1B is a block diagram illustrating an example architecture of a bond service or a service of the bond server.

FIG. 1B is a block diagram illustrating an exemplary architecture of a bond service 108 or a service of the bond server 120 (generally, of a bond service). In the illustrated embodiment, the bond service includes a plurality of functional modules, each of the functional modules configured to perform a function of the bond service. The various functional modules can be implemented by using programmable circuitry programmed by software and/or firmware, or by using special-purpose hardwired circuitry, or by using a combination of such embodiments. In some instances, the functional modules are implemented as units in a processor of the bond server.

In one embodiment, the functional modules include a communications module 150. In some instances, the communications module 150 is configured to receive Ed-Tech bond-related requests from a user. For example, a user can make a request to analyze whether a particular district is a good candidate for an Ed-Tech bond program. In some instances, the communications module 150 can prompt the user for particular information needed for the analysis, such as the state in which the user is interested in setting up an Ed-Tech bond program, or the selection of a particular K-14 district that has been identified and provided by the bond server/service. In some instances, the communications module 150 sends information received from the user to other appropriate functional modules for further processing.

In some instances, the user has pre-identified a particular district in which an Ed-Tech bond program would be appropriate, and the user wishes to identify different multi-year plans. The communications module 150 can prompt the user to input information, such as a district's technology needs and the amount to be financed over the term to provide for the district's technology needs, the term length of the bonds which corresponds to a useful asset life of technology assets needed by the district, and the number of financings to be performed over a total number of years.

In some embodiments, the communications module 150 can request and receive the information pertaining to the district's technology needs and the useful life of the technology assets needed by the district periodically, for example, prior to sale of each set of short-term bonds in a series of short-term bonds that are part of a bond program implemented by the district.

As an output from the bond service/server, the user would expect, for example, a cashflow table, an example of which is shown in FIG. 2 and discussed in more detail below.

In one embodiment, the functional modules include an assessed valuation module 152. The assessed valuation of a district is the value of all property in the district for taxing purposes. The assessed valuation module 152 is responsible for projecting a district's future assessed valuation based on reasonable assumptions regarding future growth. In some instances, the assessed valuation module 152 can access database 109/121 for historical assessed valuations for a district and for other needed economic information to model the growth potential of a district. Information not available in database 109/121 can be requested from the user via the communications module 150.

In some embodiments, the assessed valuation module 152 can periodically determine a district's future assessed valuation and associated projected tax revenue, for example, prior to the sale of each set of short-term bonds in a series of short-term bonds that are part of a bond program implemented by the district.

In one embodiment, the functional modules include a political comparison module 154. The political comparison module 154 obtains political information about a district of interest, such as the percentage of Republican and Democratic voters and past voting history of the district pertaining to passing bond measures, particularly measures related to educational funding. Information can be obtained by accessing database 109/121 or by requesting the information from the user. Upon acquiring the relevant political information for a district, the political comparison module 154 determines whether the profile is consistent with a district that is likely to pass an Ed-Tech bond program. For example, Democratic leaning districts are more likely to vote for the bond program. Districts deemed to be unsuitable candidates for the Ed-Tech bond program are identified as such to the user.

In one embodiment, the political comparison module 154 also requests and receives voter survey results pertaining to approval for a bond program for the district's technology needs. The voter survey results can include, but is not limited to, percent approval for a certain total duration of the bond program, percent approval for a duration of the repayment period for the series of short-term bonds to be sold in the bond program, an approximate amount of technology needs to be funded for each of the series of short-term bonds, and an amount to be repaid to finance the bonds.

In one embodiment, the functional modules include a calculation module 156. The calculation module 156 requests from database 109/121 the tax rate that can be levied for a district of interest. The calculation module 156 multiplies the tax rate by the assessed valuation determined by the assessed valuation module 152 to determine the available tax to be used for payment of principal and interest on the Ed-Tech bonds.

Additionally, the calculation module 156 identifies the parameters for a series of short-term bonds to be financed, where the time period over which each of the short-term bonds in the series are financed can be consecutive, staggered, or even overlapping. The calculation module 156 takes information provided by the user about the useful life of the technology assets needed by the district and substantially matches an appropriate term for one of the series of short-term bonds to the useful life. Thus, the short-term bonds used to finance the technology assets are repaid during the useful lifetime of the financed assets. Further, the amount financed by each series of short-term bonds should correspond to a cost of the district's technology needs for that term, where the technology needs include both assets and operational costs related to those assets. The calculation module 156 also takes into account voter survey results received by the political comparison module 154.

In some embodiments, the calculation module 156 periodically re-evaluates the parameters of the remaining short-term bonds in the bond program, for example, prior to the sale of each set of short-term bonds in a series of short-term bonds that are part of the bond program implemented by the district. The re-evaluation is based upon updated data received by the communications module 150 about the district's technology needs and the useful life of technology assets needed by the district for the period of the upcoming short-term bonds to be sold and an updated determination performed by the assessed valuation module 152 of the district's future assessed valuation and associated projected tax revenue.

The calculation module 156 also determines the current interest rates for short-term securities from the database 109/121 and uses the information to determine a cashflow table similar to the one shown in FIG. 2 for one or more sets of parameters. Unlike a typical bond issue financing over 20-30 years in which over 50% of tax revenues are used to pay interest costs, well over 90% of the tax proceeds for Ed-Tech bonds are used to pay for technology needs of the district because the Ed-Tech bonds are short-term securities with a correspondingly low interest rate.

The table in FIG. 2 shows an example Ed-Tech bond financing for a district with a current assessed valuation (AV) of $6 billion, annual increases in assessed valuation of 2.25%, and a $60 tax rate for every $100,000 of AV. Further, an annual interest rate of 1% is used in the calculations. Other parameters used in the table are: a three-year short-term period for each bond sale distributed uniformly over a total of 30 years.

In one embodiment, the functional modules include a state metric comparison module 158. The state metric comparison module 158 obtains state metric information and information about the number of students in the district of interest from database 109/121. Alternatively or additionally, the state metric comparison module 158 can request the information from the user. The state metric comparison module 158 divides each short-term bond period's financing, as determined by the calculation module 156, by the number of years in the short-term bond period and the number of students in the district to obtain the amount of annual funding per student. If the funding per student is not within an acceptable range of the state metric, the calculation module 156 re-calculates the cashflow table using more appropriate parameters, such as a lower tax rate if the funding per student is more than a certain factor greater than the state metric, for example, a factor of 10. If the funding per student is less than a certain factor than the state metric, for example, a factor of 1/10, the district is probably not a good candidate for the Ed-Tech bond program.

Figure 1C:
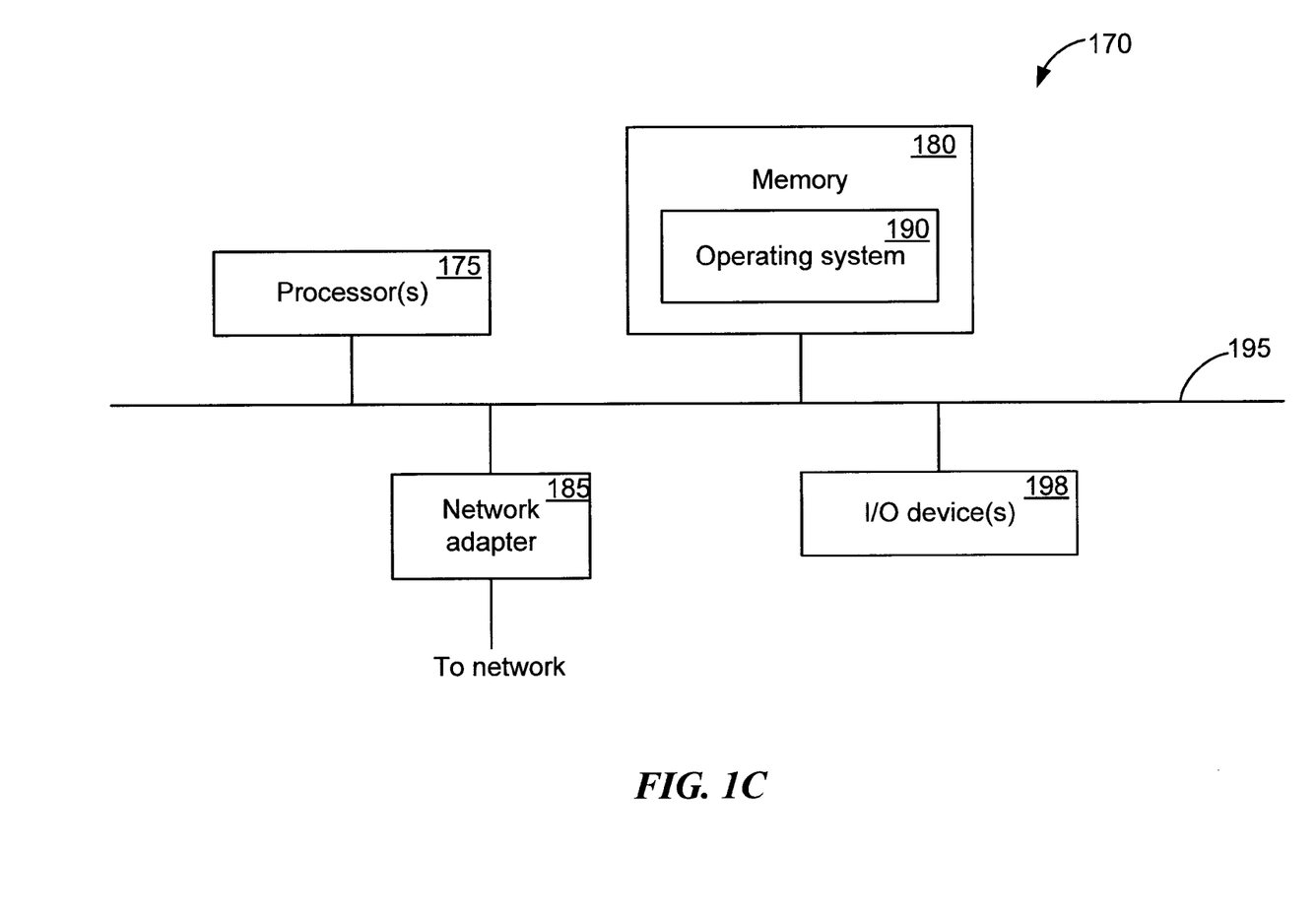
FIG. 1C is a high-level block diagram showing an example of the architecture for a computer system.

FIG. 1C is a high-level block diagram showing an example of the architecture for a computer system 170 that can be utilized to implement a personal computing device (e.g., 102 from FIG. 1A) for running a bond service, a bond server 120, or a web server (e.g., 122 from FIG. 1A), etc. In FIG. 1C, the computer system 170 includes one or more processors 175 and memory 180 connected via an interconnect 195. The interconnect 195 is an abstraction that represents any one or more separate physical buses, point to point connections, or both connected by appropriate bridges, adapters, or controllers. The interconnect 195, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 175 may include central processing units (CPUs) to control the overall operation of, for example, the host computer. In certain embodiments, the processor(s) 175 accomplish this by executing software or firmware stored in memory 180. The processor(s) 175 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 180 is or includes the main memory of the computer system 170. The memory 180 represents any form of random access memory (RAM), read-only memory (ROM), flash memory (as discussed above), or the like, or a combination of such devices. In use, the memory 180 may contain, among other things, a set of machine instructions which, when executed by processor 175, causes the processor 175 to perform operations to implement embodiments of the present disclosure.

One or more input/output (I/O) devices 198 can include a keyboard, mouse, touch screen or other touch input device, a display, and speakers. Also connected to the processor(s) 175 through the interconnect 195 is a network adapter 185. The network adapter 185 provides the computer system 170 with the ability to communicate with remote devices, such as storage clients, and/or other storage servers, and may be, for example, an Ethernet adapter or Fiber Channel adapter.

Figure 3:
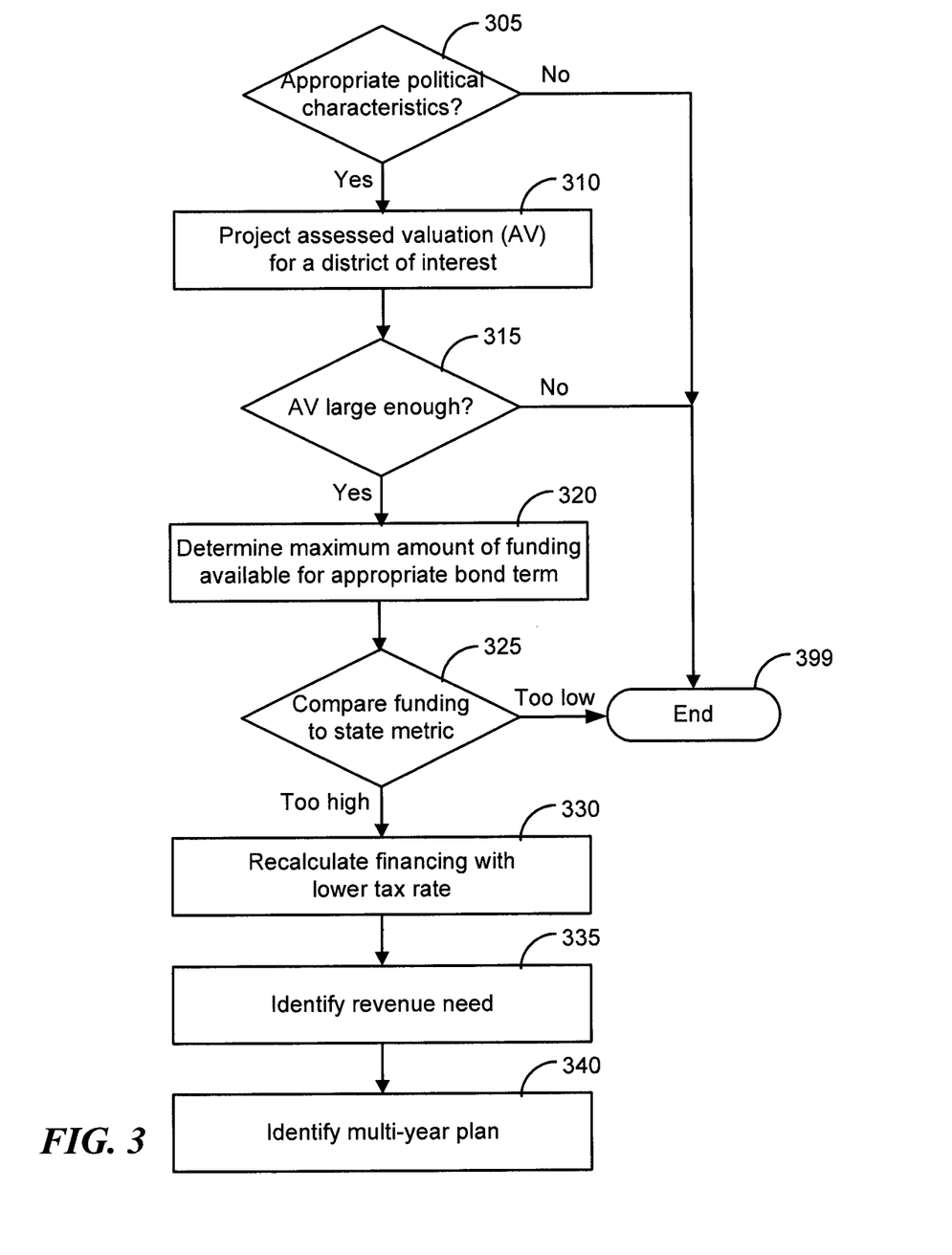
FIG. 3 is a flow diagram illustrating an example process of determining the appropriate bonds to issue.

FIG. 3 is a flow diagram illustrating an example process of determining the appropriate parameters for an Ed-Tech bond program for a district. In some instances, the user can identify a particular district for analysis. In some instances, the system provides the user with a list of districts in a particular state or area for the user to select from. The list can be narrowed down by the use of criteria specified by the user, such as number of students or average median income in the district.

At decision block 305, the system determines if the district has appropriate political characteristics that would make it likely that the voters would approve an Ed-Tech bond program if put on the ballot in that district. Examples of political characteristics include the ratio of Republican to Democratic voters, as a strongly Republican district is unlikely to authorize the Ed-Tech bonds, and past voting history of the district, as voters who have voted down educational bond measures in the past are unlikely to authorize the Ed-Tech bond program. If the district does not have the appropriate political characteristics (block 305—No), the user is informed, and the process ends at block 399. The user can select a different district for analysis by the system and start at block 305 again. In some instances, the system can provide a list of districts to select from that meet criteria provided by the user. Alternatively, the user can choose to continue with identifying Ed-Tech bond parameters despite unfavorable political characteristics.

If the district has the appropriate political characteristics (block 305—Yes), at block 310, the system determines a projected assessed valuation (AV) for the district over the ensuing 30-year period. The projected AV can be modeled based on historical AVs and economic indicators for the district.

Then at decision block 315, the system determines whether the projected AV is large enough to produce sufficient tax revenue over a short-term period of approximately three to five years to justify the transactional costs of the Ed-Tech bond program. For example, if a school district has only 20 students, the costs of the Ed-Tech bond program may not make sense. In some instances, approximately one million dollars in tax revenue is needed in the short-term period to justify the implementation of an Ed-Tech bond program.

Next, at block 320 the system determines the maximum amount of funding available for an appropriate bond term. While the short-term period is typically between three and five years, it can be shorter or longer. The length of the short-term period is selected depending on the district's technology needs and the type of assets being purchased. For example, if the useful life of technology needed by the district is approximately three years, the term of the short-term bonds are selected to roughly correspond to that time frame. Although the terms of the ten series of bonds shown in the table in FIG. 2 are the same, the term can vary from financing to financing of the short-term bonds, depending on the useful life of the assets to be financed.

The maximum amount of a bond issue is dependent upon the amount of taxes that can be raised from the AV base over the ensuing short-term period. In California, unified districts can raise up to $60 per $100,000 of AV per year; elementary and high school districts can raise up to $30 per $100,000 of AV; and community college districts can raise up to $25 per $100,000 of AV. In the example cashflow table shown in FIG. 2, a $60 tax rate is used for a projected AV of six billion dollars for a mid-size school district. For this school district, each three-year short-term financing period produces about ten to eleven million dollars for the district's technology needs.

Then at decision block 325, the system identifies the state metrics for technology funding and compares it to the amount of funding determined at block 320. Typically, state metrics are specified in terms of funding per student. The system can access the information from database 109/121 or request the information from the user. For the example shown in the table in FIG. 2, if there are 5000 students, ten million dollars over three years results in available funds of approximately $700 per student per year. If the available funds per student per year are too low, for example, one tenth of the state metric, the district is probably not a good candidate for an Ed-Tech bond program. In this case, the process ends at block 399.

If the available funds per student are too high, for example, ten times the state metric, then the $10 million financing amount over three years is probably too large. If this is the case, at block 330, the system recalculates the bond financing using a lower tax rate to identify a lower short-term financing amount.

Then at block 335, the system identifies the district's technology revenue needs to ensure that the total amount financed is adequate. In the example shown in FIG. 2, the total principal amount to be financed with the Ed-Tech bonds is $148.9 million and is made up of 10 short-term financings evenly spread out over 30 years. A person of skill in the art will understand that the number of short-term financings can vary, for example, from two to fifteen.

Finally, at block 340 the system identifies the total number of years for the multi-year plan. One factor that can be taken into account in this decision includes political tolerance for the length of the multi-year plan. The longer the length of the multi-year plan, the less frequently the district is required to place another Ed-Tech bond program on the ballot for voter approval.

The multi-year technology financing plan provides for continual renewal of technology to incorporate changes in district needs and replacement of equipment without further voter approval. The multi-year plan also provides the ability to accelerate or decelerate funding depending on the pace of growth in underlying AV as well as shifts in student populations. The plan can also fund items such as information technology (IT) personnel to implement a technology plan, required software to comply with various state mandated programs, and electronic textbooks.

Figure 4:
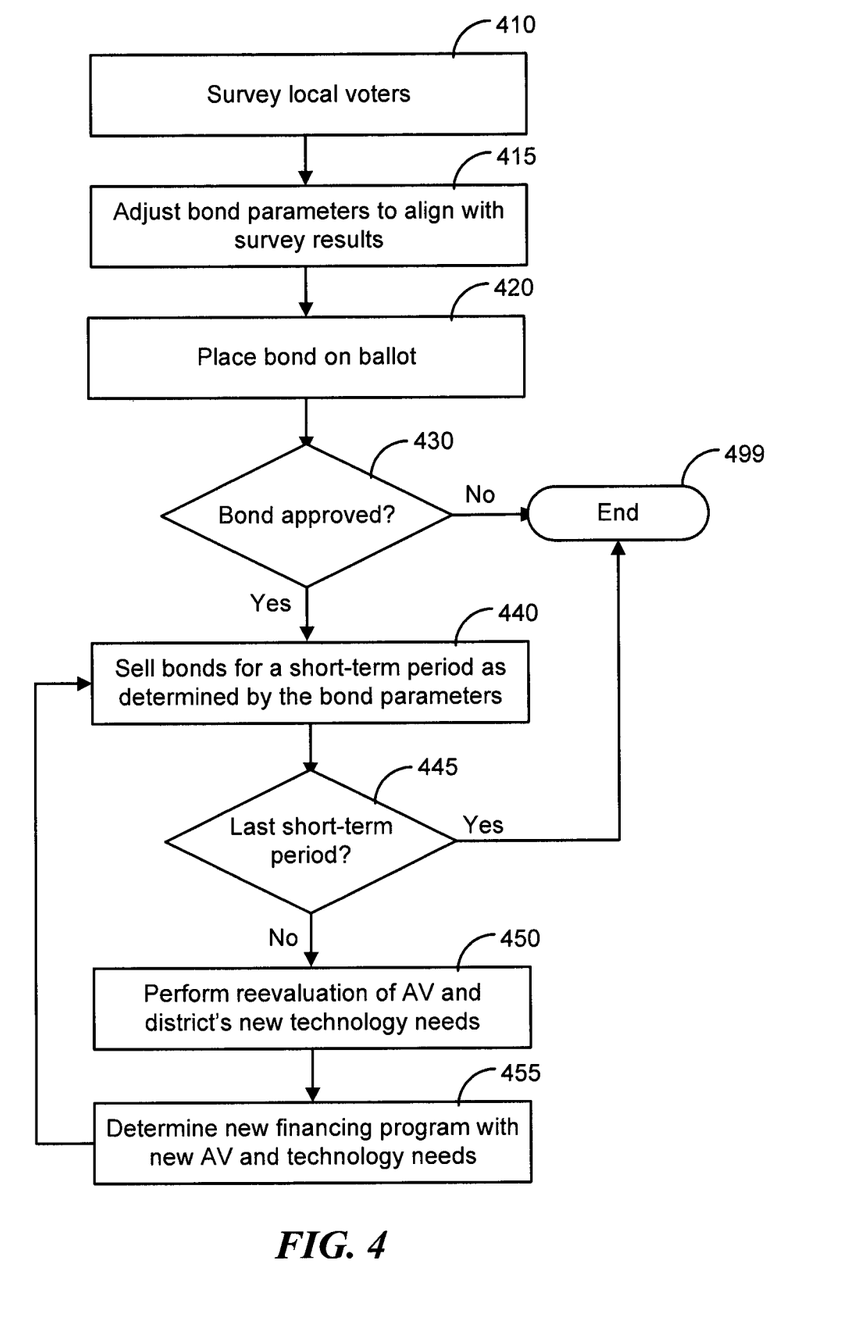
FIG. 4 is a flow diagram illustrating an example process of issuing bonds for short-asset life equipment.

FIG. 4 is a flow diagram illustrating an example process of issuing bonds for short-asset life equipment. At block 410, local voters of a district of interest are surveyed to determine the level of support for the Ed-Tech bond program, tax levy, and the length of the program. The survey can be conducted randomly within the district of interest.

Then at block 415, the bond parameters are adjusted to align with the survey results. For example, if voters are found to support a certain level of taxation to support the Ed-Tech bond program or a certain length of the program, these parameters can be used to recalculate a bond program that is likely to pass at the polls.

Next, at block 420, the customized bond program is placed on the ballot for voter approval in the district of interest. The customized bond program specifies the total amount of bonds to be authorized for sale by the district, the types of projects to be funded (e.g., technology, software), an overview of the financing plan (i.e., the matching of the useful life of technological devices to the amortization term of each financing within the program; the spacing of the financings over the 30 year term in order to provide continuing updates and replacements of technological equipment), and the projected tax rates (tax rate after the sale of the first series of bonds, last series of bonds, and maximum over the financing program).

And at block 430, it is determined after the election whether the bond was authorized by the voters to be issued. If the bond was not authorized to be issued (block 430—No), the process ends at block 499. The bond program parameters can be changed, or the same bond program can be placed on the ballot in a subsequent election in an attempt to gain voter approval again.

If the bond was authorized to be issued (block 430—Yes), at block 440 bonds are sold for the short-term period as determined by the bond parameters, and the proceeds of the bonds are used to pay for the technology needs of the district for the current short-term period. Payments of principal and interest on the bonds will be paid to the purchasers of the bonds and paid out of taxes levied within the district.

Next, at decision block 445, it is determined whether the current short-term period is the last one for the Ed-Tech bond program. If the short-term period for which the bonds are sold in block 440 is the last one for the Ed-Tech bond program (block 445—Yes), the process ends at block 499.

If there are further short-term periods left in the Ed-Tech bond program (block 445—No), at block 450, during the time leading up to the next short-term period, reevaluation of the AV of the district and the district's new technology needs is performed. Assessed valuations are reviewed to more accurately determine the amount of the bonds that can be issued for the next short-term period. Additionally, the technology needs of the district are reassessed to determine the amount of money needed. Thus, the total amount of technology funds raised per financing cycle is directly dependent upon the district's technology needs and on the remaining amount of unused bond authorization.

Then at block 455, a new financing program is determined for the remaining short-term periods left in the Ed-Tech bond program using the newly obtained information about the district's AV and technology needs. A new table similar to the one shown in FIG. 2 is developed for the remaining short-term periods. Depending on the district's upcoming technology needs and asset requirements, the upcoming bond term can be different from the preceding bond term.

The process returns to block 440 where bonds are sold prior to the upcoming short-term period using the new financing parameters. The proceeds from sale of the new short-term bonds are used by the district to pay for the technology needs of the district for the upcoming short-term period.

Figure 5:
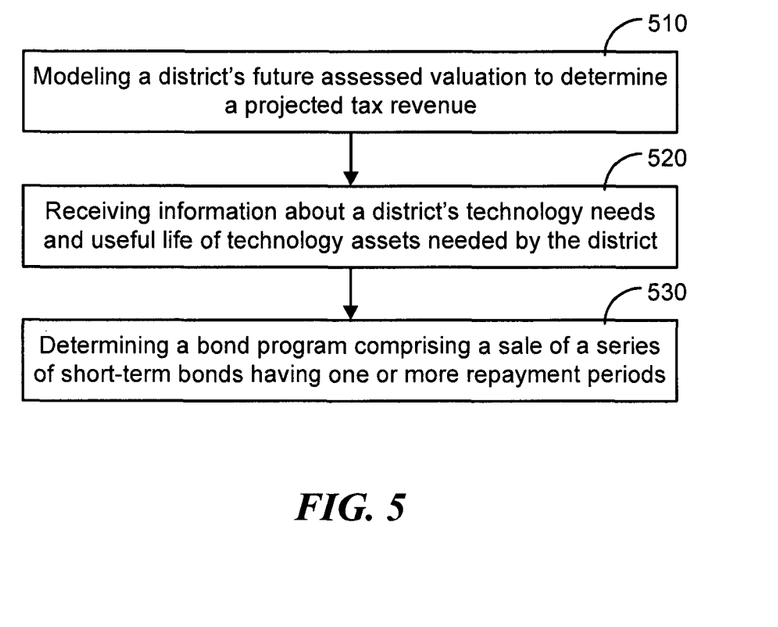
FIG. 5 is a flow diagram illustrating an example process of determining parameters for a bond program based on assessed valuation for a district and the district's technology needs.

FIG. 5 is a flow diagram illustrating an example process of determining parameters for a bond program based on assessed valuation for a district and the district's technology needs. The process includes modeling a district's future assessed valuation to determine a projected tax revenue; receiving information about a district's technology needs and useful life of technology assets needed by the district; and determining a bond program comprising sale of a series of short-term bonds having one or more repayment periods. A repayment period of one of the series of short-term bonds is substantially matched to the useful life of technology assets to be purchased during the repayment period, an amount financed by one of the series of short-term bonds is substantially matched to a cost of the district's technology needs for the repayment period of the one of the series of short-term bonds, and the projected tax revenue over the repayment period of one of the series of short-term bonds is sufficient to pay for principal and interest on the one of the series of short-term bonds.

Figure 6:
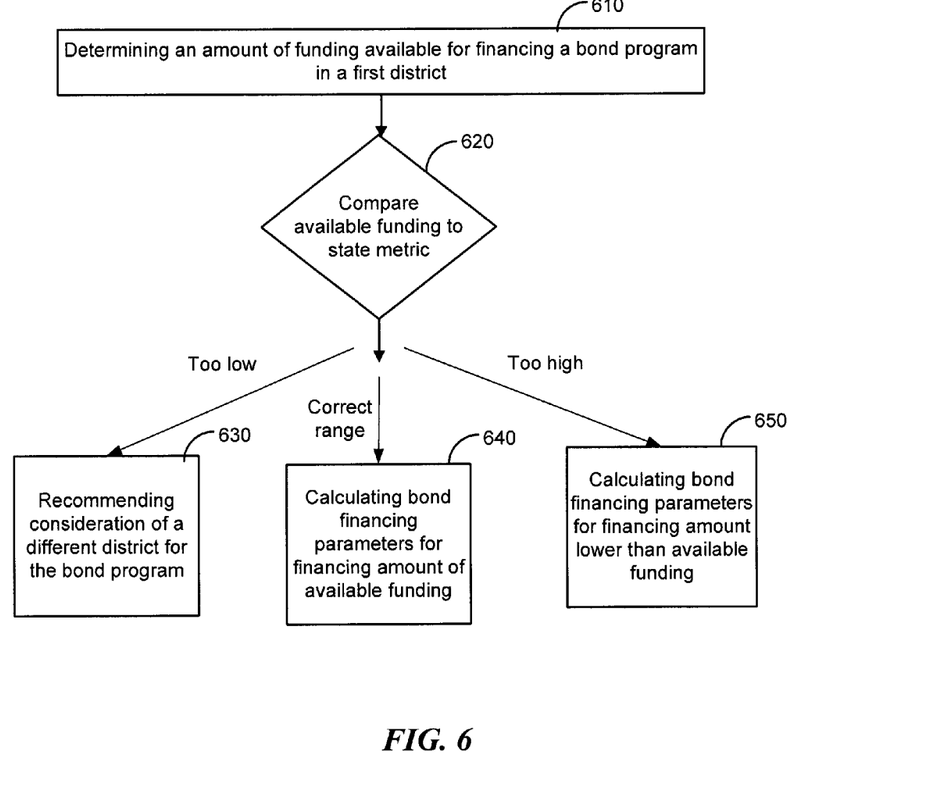
FIG. 6 is a flow diagram illustrating an example process of determining parameters for a bond program relative to state metrics.

FIG. 6 is a flow diagram illustrating an example process of determining parameters for a bond program relative to a state metric. The process includes determining an amount of funding available for financing a bond program in a district for the district's technology needs and comparing the available funding to a state metric. If the available funding is at least a given factor lower than the state metric, recommending consideration of a different district for the bond program. If the available funding is at least a given factor higher than the state metric, calculating financing parameters for the bond program to finance a lower amount than the amount of available funding. If the available funding is within an appropriate range of the state metric, calculating financing parameters for the bond program to finance the amount of available funding. The factors used in the determination of an appropriate range of available, financing can be pre-set or provided by the user.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

I claim:

1. A processor-implemented method comprising:
    modeling by a computer system including a processor a district's future assessed valuation to determine a projected tax revenue;
    receiving by the computer system information about the district's technology needs and duration over which technology assets needed by the district will be used, the duration over which technology assets will be used provided by a user; and
    determining by the computer system a bond program comprising sale of a series of short-term bonds having one or more repayment periods, wherein a repayment period of one of the series of short-term bonds is customized based on the user provided duration over which technology assets will be used, an amount financed by one of the series of short-term bonds is substantially matched to a cost of the district's technology needs for the repayment period of the one of the series of short-term bonds, and the projected tax revenue over the repayment period of one of the series of short-term bonds is sufficient to pay for principal and interest on the one of the series of short-term bonds.

2. The method of claim 1, wherein less than 10% of short-term bond proceeds is used to pay the interest on the short-term bonds.

3. The method of claim 1, further comprising placing the bond program on a district's ballot to obtain voter approval.

4. The method of claim 3, wherein the placing of the bond program on the district's ballot is based, at least in part, on a predetermined political characteristic of the district.

5. The method of claim 1, further comprising ensuring that a financed amount for each one of the series of short-term bonds is adequate to support a pre-determined metric, wherein the pre-determined metric includes technology funding on a per student basis for a defined geography at a time of implementation of the bond program.

6. The method of claim 1, wherein the bond program comprises between a series of two short-term bonds and a series of fifteen short-term bonds.

7. The method of claim 1, wherein the district's technology needs comprises the technology assets and technology support staff.

8. The method of claim 1, wherein the repayment period is between three and five years.

9. The method of claim 1, wherein the short-term bonds are tax-exempt bonds.

10. A system comprising:
    at least one memory component storing a software program; and
    a processor coupled to the memory component, wherein the processor is configured to execute the software program, the software program comprising:

a first module operable to request and receive periodically prior to sale of a set of short-term bonds in a series of short-term bonds data about a district's technology needs and a duration over which technology assets needed by the district will be used;

a second module operable to determine periodically prior to sale of a set of short-term bonds in a series of short-term bonds a district's future assessed valuation and associated projected tax revenue;

a third module operable to request and receive voter survey results pertaining to a total length of the bond program; and a fourth module operable to initially determine a bond program based on the voter survey results, and to periodically determine prior to sale of a set of short-term bonds in a series of short-term bonds a remaining bond program, wherein the bond program comprises sale of the series of short-term bonds having one or more repayment periods, wherein a repayment period of one of the series of short-term bonds is customized based on the duration over which technology assets to be purchased during the repayment period will be used, an amount financed by one of the series of short-term bonds is substantially matched to a cost of the district's technology needs for the repayment period of the one of the series of short-term bonds, and the projected tax revenue over the repayment period of one of the series of short-term bonds is sufficient to pay for principal and interest on the one of the series of short-term bonds and provide information on the bond program to the user.

11. The system of claim 10, further comprising a database configured to store data pertaining to tax rates, interest rates, economic data, state metrics, and student populations in each district, wherein the database is accessible by the processor.

12. The system of claim 10, further comprising a fifth module operable to identify political characteristics of the district to determine suitability of a district for the bond program.

13. The system of claim 10, wherein the fourth module is further operable to ensure that a financed amount for each of the series of short-term bonds is adequate to support a pre-determined metric, wherein the metric includes technology funding on a per student basis for a defined geography at a time of implementation of the bond program.

14. The system of claim 10, wherein the bond program comprises between a series of two short-term bonds and a series of fifteen short-term bonds.

15. The system of claim 10, wherein the district's technology needs comprises the technology assets and technology support staff.

16. The system of claim 10, wherein the repayment period is between three and five years.

17. A non-transitory computer-readable medium encoded with processing instructions for implementing a method performed by a computer, the method comprising:

determining an amount of available funding for financing a bond program in a first district for the district's technology needs, wherein the bond program comprises sale of a series of short-term bonds having one or more repayment periods, wherein a repayment period of one of the series of short-term bonds is customized based on the duration over which technology assets to be purchased during the repayment period will be used, an amount financed by one of the series of short-term bonds is substantially matched to a cost of the district's technology needs for the repayment period of the one of the series of short-term bonds, and the projected tax revenue over the repayment period of one of the series of short-term bonds is sufficient to pay for principal and interest on the one of the series of short-term bonds;

comparing the amount of available funding to a pre-determined metric, wherein the pre-determined metric includes technology funding on a per student basis for a defined geography at a time of implementation of the bond program; and recommending consideration of a different district for the bond program when the amount of available funding is at least a first factor lower than the pre-determined metric, calculating financing parameters for the bond program to finance a lower amount than the amount of available funding when the amount of funding available is at least a second factor higher than the pre-determined metric, or calculating financing parameters for the bond program to finance the amount of available funding when the amount of funding available meets the pre-determined metric.

18. The non-transitory computer-readable medium of claim 17, wherein the bond program comprises between a series of two short-term bonds and a series of fifteen short-term bonds.

19. The non-transitory computer-readable medium of claim 17, wherein the method further comprises placing the bond program on the first district's ballot or the recommended different district's ballot based on the determination of available funding in the respective districts.

20. The non-transitory computer-readable medium of claim 17, wherein the first factor and the second factor are specified by a user.

21. The non-transitory computer-readable medium of claim 19, wherein the placing of the bond program is further subsequently based, at least in part, on a predetermined political characteristic of the respective district.

* * * * *